Figure 1:
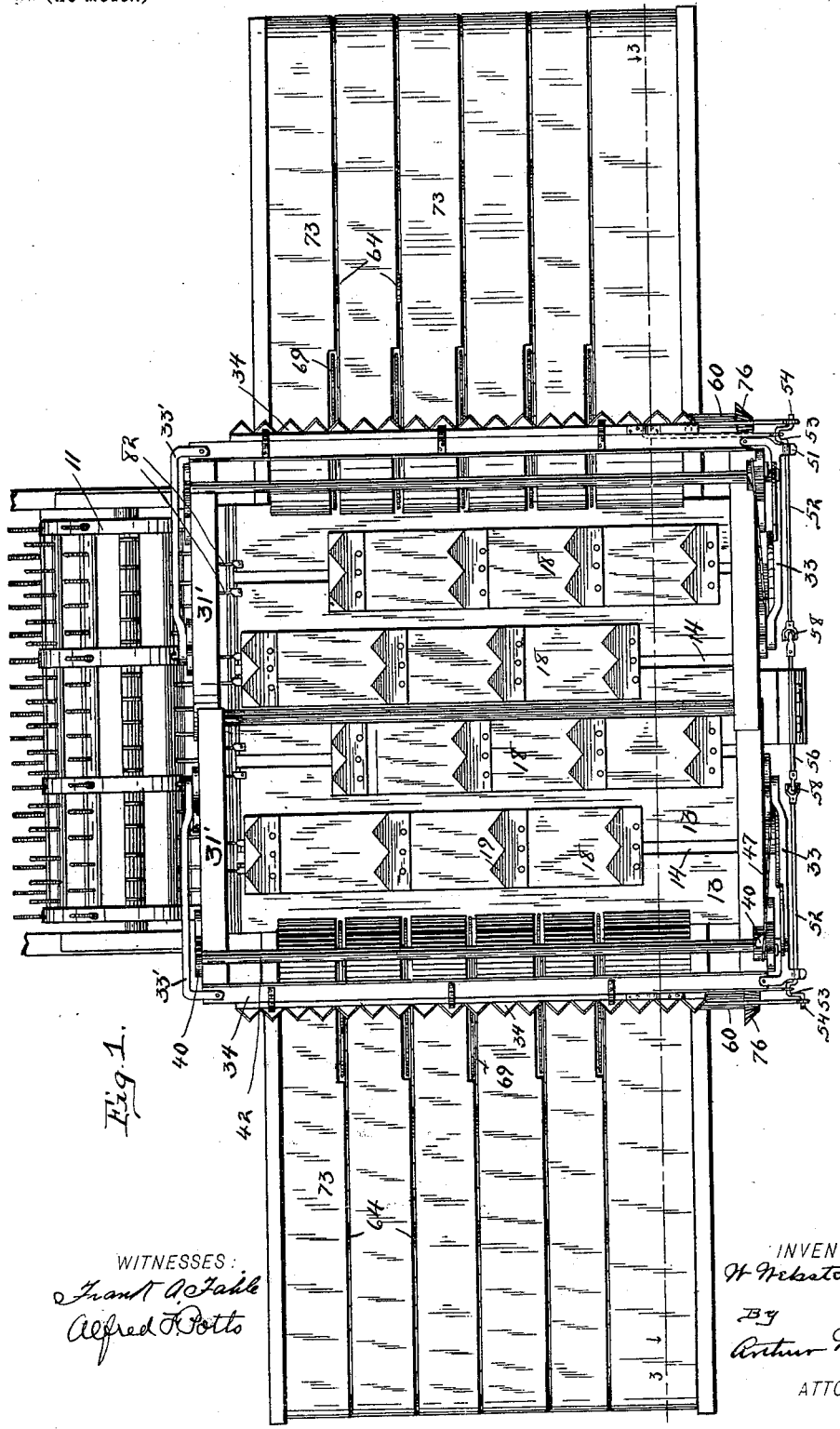

No. 658,345. Patented Sept. 25, 1900.
W. W. COLLINS.
BAND CUTTER AND FEEDER.
(Application filed Aug. 22, 1898.)
(No Model.) 5 Sheets—Sheet 1.

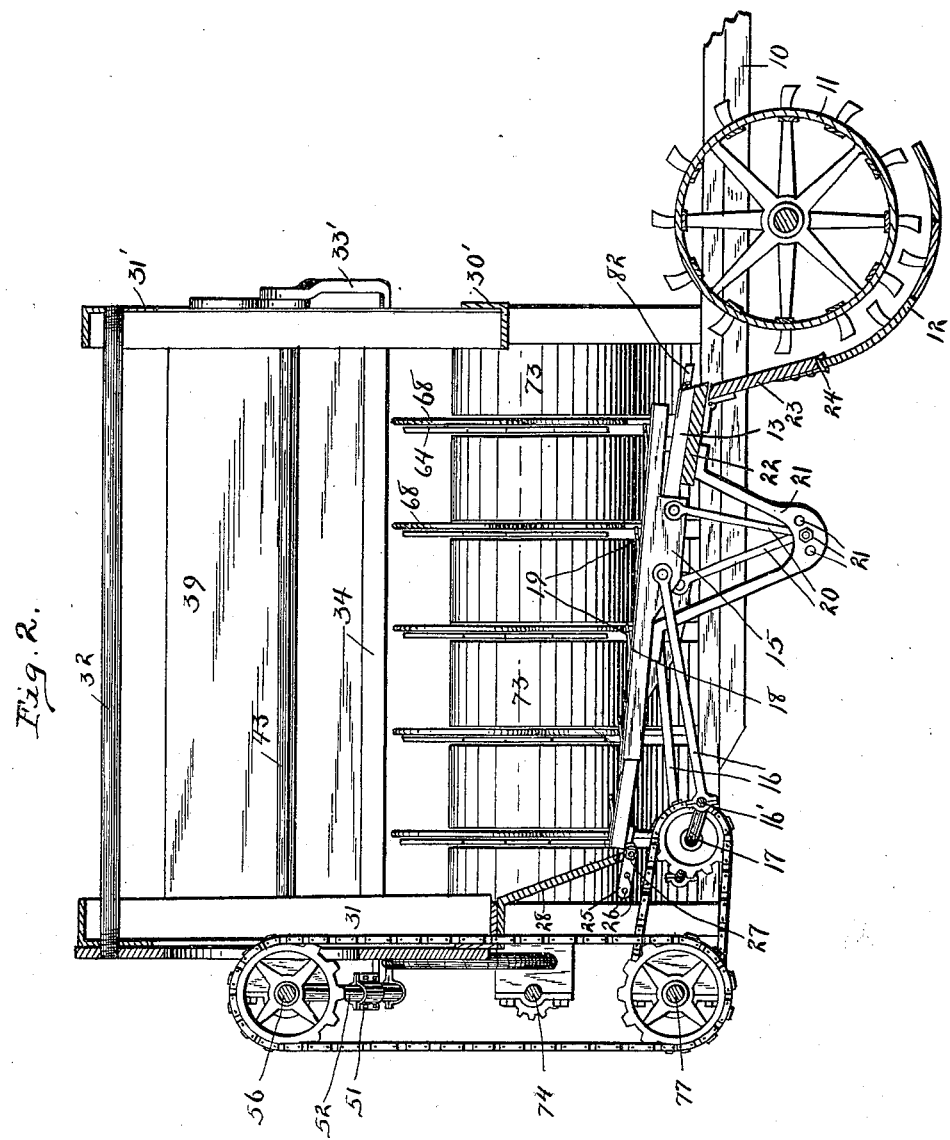

No. 658,345. Patented Sept. 25, 1900.
W. W. COLLINS.
BAND CUTTER AND FEEDER.
(Application filed Aug. 22, 1898.)
(No Model.) 5 Sheets—Sheet 3.
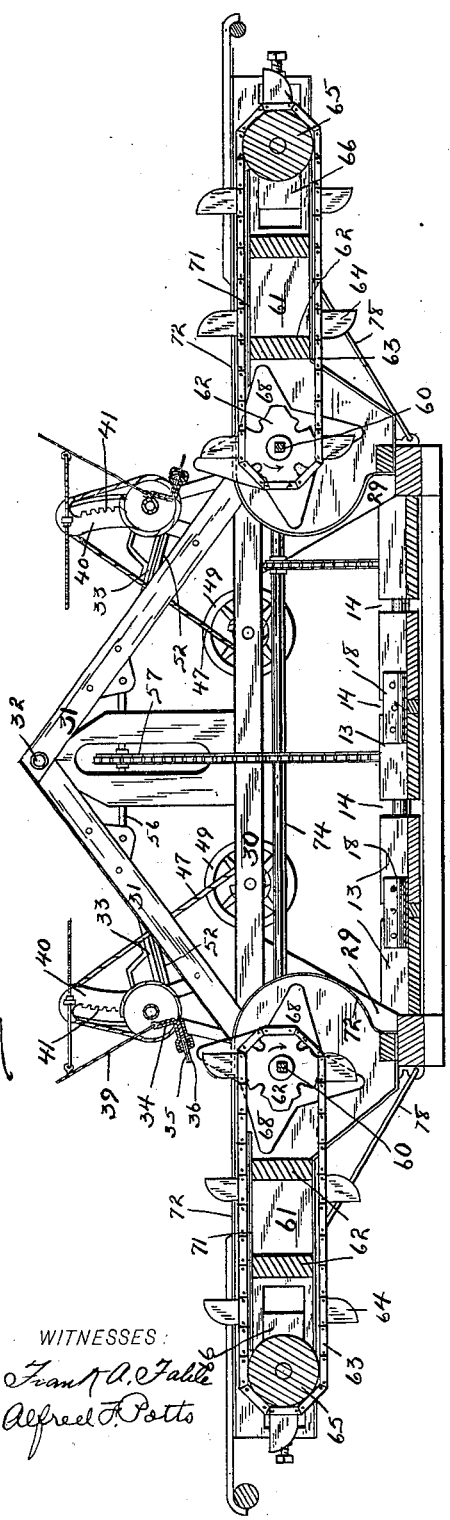
WITNESSES:
INVENTOR
W. Webster Collins
BY
Arthur M. Hood
ATTORNEY.
THE NORRIS PETERS CO., PHOTO-LITHO., WASHINGTON, D. C.

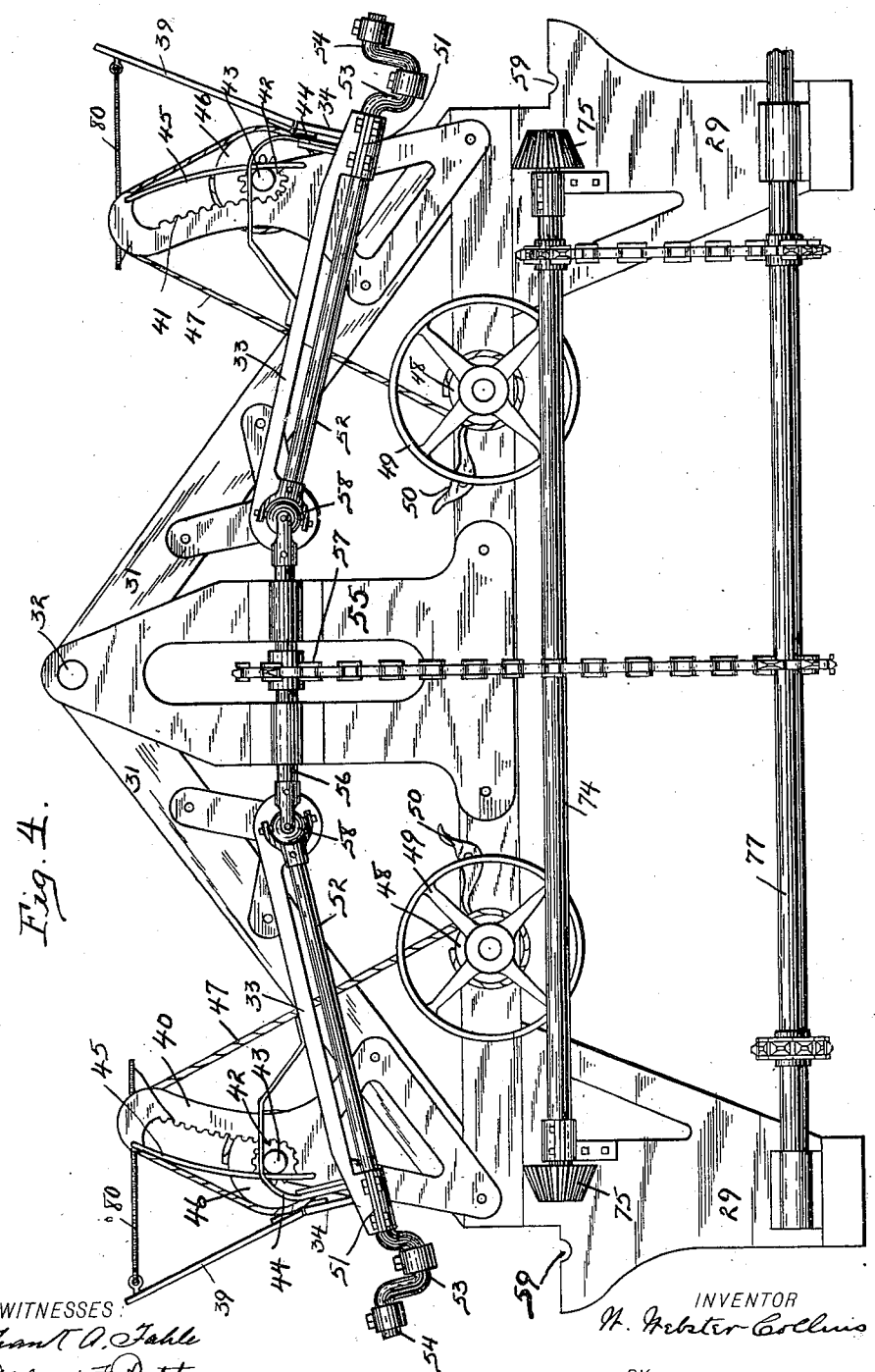

No. 658,345. Patented Sept. 25, 1900.
W. W. COLLINS.
BAND CUTTER AND FEEDER.
(Application filed Aug. 22, 1898.)
(No Model.) 5 Sheets—Sheet 5.
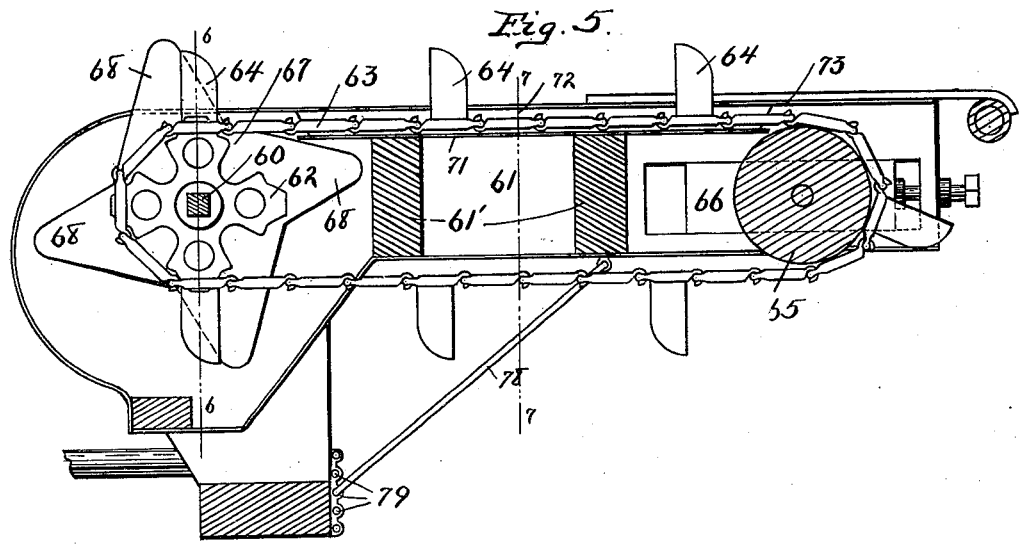
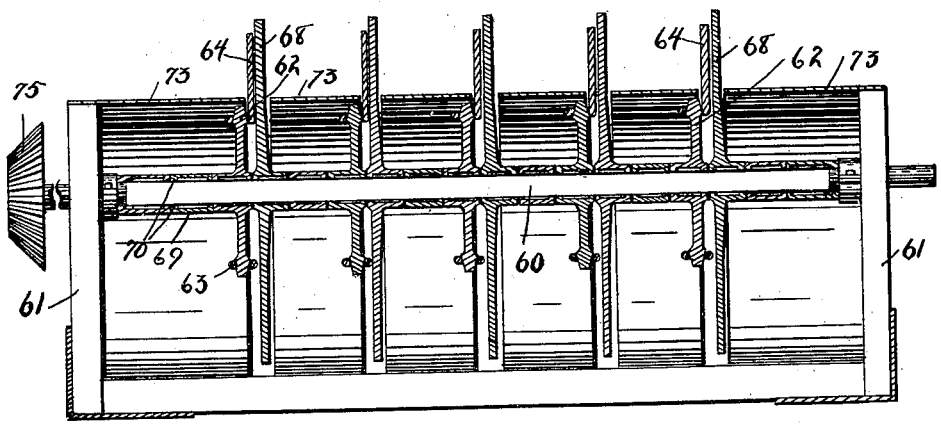
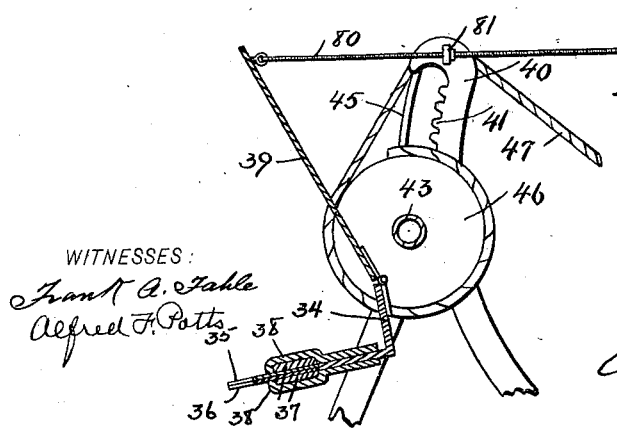
WITNESSES:
Frank A. Fahle
Alfred F. Potts
INVENTOR
W. Webster Collins
BY
Arthur M. Hood
ATTORNEY.

UNITED STATES PATENT OFFICE.

W WEBSTER COLLINS, OF INDIANAPOLIS, INDIANA.

BAND-CUTTER AND FEEDER.

SPECIFICATION forming part of Letters Patent No. 658,345, dated September 25, 1900.

Application filed August 22, 1898. Serial No. 689,168. (No model.)

*To all whom it may concern:*

Be it known that I, W WEBSTER COLLINS, a citizen of the United States, residing at Indianapolis, in the county of Marion and State of Indiana, have invented a new and useful Band-Cutter and Feeder, of which the following is a specification.

My invention relates to an improvement in band-cutters and feeders.

The objects of my invention are to provide an improved form of vibrating feed-table therefor, to provide improved means for driving and adjusting the cutters by means of which the mass of grain may be severed, to provide an improved form of transverse feed-table, to provide improved means for disengaging the grain from the feed-belts of the transverse table, and to provide such details of construction as shall be hereinafter pointed out.

The accompanying drawings illustrate my invention.

Figure 1 is a plan of the entire device. Fig. 2 is a central vertical section. Fig. 3 is a section on line 3 3 of Fig. 1. Fig. 4 is an end elevation, on a larger scale, of the cutter driving and adjusting mechanism. In this view the transverse feed-tables and the vibrating feed-table have been omitted. Fig. 5 is a similarly-enlarged vertical section of one of the transverse feed-tables. Fig. 6 is a section on line 6 6 of Fig. 5. Fig. 7 is a section on line 7 7 of Fig. 5. Fig. 8 is an enlarged detail of the cutter-support and attached parts.

In the drawings, 10 indicates the usual frame of a separator, in which is mounted the threshing-cylinder 11 and the coöperating concave 12. Mounted to the rear of the cylinder is a vibrating feed-table which consists of a stationary platform composed of a series of strips 13, which are so arranged as to leave a series of slots 14 between them, in the drawings the said slots being four in number. Mounted in each slot 14 is a bar 15, which is adapted to be reciprocated therein by means of a connecting-rod 16, one end of which is secured to the bar and the other end of which is attached to one of a series of cranks 16', carried by a shaft 17, which is mounted in suitable bearings beneath the rear ends of the strips 13. Mounted upon the upper edge of each bar 15 is a strip 18, preferably of sheet metal, which extends beyond and overlaps the adjacent edges of the strips 13. Upon the upper face of each strip 18 is mounted a series of inclined teeth 19, which point toward the cylinder. If desired, the feed-bars (composed of the bars 15 and strips 18) may be entirely supported by the strips 18; but I prefer to support the forward ends thereof by means of a link 20, the upper end of which is pivoted to the bar 15 near its forward end and the lower end of which may be pivotally supported at any one of a number of points 21 upon a depending bracket 21', one of which is secured to the bottom of each strip 13 near each slot 14. The forward ends of the strips 13 are secured together by means of a cross-bar 22, and to the forward end of said cross-bar is hinged the upper edge of a throat-piece 23, the lower edge of which is provided with a foot 24, adapted to engage and to rest upon the upper edge of the concave 12. The rear ends of the strips 13 are connected by a cross-bar, which carries at each end a projecting arm 25, provided with a series of holes 26. Holes 26 are each adapted to receive a bolt or pin 27, which also enters the frame 28, the arrangement being such that the feed-table may be shifted as a whole toward or from the cylinder by changing the position of the bolts with relation to the arms 25, thus widening or narrowing the throat between the cylinder 11 and the throat-piece 23.

The cranks 16' of the shaft 17 are preferably alternated one hundred and eighty degrees apart, so that the feed-bars may also be placed alternately in the usual manner.

Any desired means may be used to sever the bands of the grain-bundles and to feed the grain to this vibrating table, above described; but I prefer to use the automatic means which I shall now describe.

Mounted at both ends of the table just described, one at each side, are castings or bearing-blocks 29 29, the upper ends of the rear blocks being connected by a cross-bar 30. Secured to the ends of bar 30 are the ends of two bars 31 31, the other ends of said bars being secured together, the arrangement being such as to form a triangular frame, the apex of which is substantially in line with the longitudinal center of the machine. A similar frame is formed at the forward end of the vibrating table by means of the bars 30' and 31' 31', and the apexes of the two frames are connected by means of a bar 32. Pivoted upon each of the bars 31 is an outwardly-extending arm 33, and pivoted to each of the bars 31' is a similar arm 33'. Secured to the outer ends of each pair of arms 33 and 33' is an angle-iron 34, one flange of which is substantially in line with said arms. Mounted upon this flange is a pair of reciprocating cutters 35 36. Knives 35 36 may be mounted upon the angle-iron in any desired manner; but in the drawings I have shown each knife provided along its rear edge with a shoulder 37, which is adapted to be embraced by one of a pair of clips 38, which clips are secured to the angle-iron, the arrangement being such that the outer end of the flange will serve as an abutment against which the rear edges of the cutters may bear. Hinged to the upper edge of the other flange of each angle-iron 34 is a guard-plate 39, the purpose of which will be made to appear. Secured near the outer lower end of each bar 31 and 31' is an upright 40, each one of which is provided near its upper end with a segmental rack 41, which rack is concentric, or substantially so, with the pivotal point of the adjacent arms 33 or 33'. Mounted so as to move along each rack 41 is a pinion 42, the two pinions of each side of the machine being connected by means of a shaft 43, which projects through the said pinions and at each end is engaged by a yoke 44, carried by the arms 33 and 33', the arrangement being such that the outer ends of said arms, together with the parts attached thereto, are supported upon said shaft. In order to maintain the pinions 42 in engagement with the racks 41, I mount in front of each rack a guide-rod 45, which engages the shaft 43, and thus prevents the pinion from slipping out of the rack. Secured to each shaft 43 is a drum 46, to which one end of a cable 47 is attached. Cable 47 is passed up and over the upper end of the adjacent upright 40 and the opposite end thereof secured to a winding-drum 48 mounted upon the bar 30. Drum 48 is provided with a suitable hand-wheel 49 and with a locking-pawl 50.

For the purpose of driving the cutters 35 and 36 I mount in suitable bearings 51, carried by the outer ends of each of the arms 33, a shaft 52, the outer end of which is provided with a pair of cranks 53 54, which are connected by suitable pitmen with the cutters 35 and 36, respectively. Mounted in a suitable bearing 55, supported between the bars 30 and 31, is a shaft 56, provided at its middle with a suitable sprocket or driving pulley 57. The opposite ends of shaft 56 are extended to a point in line with the pivotal points of the arms 33 and at these points are connected by means of the universal joints 58 with the inner ends of the shafts 52.

Each of the bearing-blocks 29 is provided with a bearing 59, each pair of which is adapted to receive the opposite ends of a shaft 60, which forms a portion of a transverse feed-table. There are two of these feed-tables, one upon each side of the machine, and as the two are alike I shall confine the description to one table. Each of the transverse feed-tables consists, primarily, of a pair of side bars 61, which are connected near their middles by means of a pair of cross-bars 61'. Mounted in suitable bearings near one end of the frame thus formed is the shaft 60, previously mentioned. That portion of the shaft 60 which lies between the side bars 61 is preferably polygonal in cross-section, and on this portion of the shaft is mounted a series of sprocket-wheels 62, which are provided at their centers with polygonal openings adapted to fit the shaft. Passing over each sprocket 62 is an endless link belt 63, which is provided at intervals along its length with projecting fingers or drags 64. At the opposite end of the frame the several endless belts are passed around an idler 65, the ends of the shaft of which are supported in adjustable boxings 66. Immediately adjacent each sprocket 62 and mounted upon the shaft 60, so as to turn therewith, is a breaker-wheel 67, provided with a series of radiating arms 68. The number of arms 68 is such that upon the rotation of the shaft 60 one of said arms will be brought up slightly in advance of each drag 64, and one of said arms will also be brought up between each pair of drags. It will be understood that those arms which come up between each pair of drags may be omitted, if desired.

In order to properly space the sprocket-wheels and the breaker-wheels upon the shaft 60, I provide a series of spacing-collars 69, each of which has an internal diameter larger than the shaft, but each of which is provided at each end with a thin internal flange 70, through each of which is formed an opening adapted to fit the polygonal portion of the shaft. By this means the spacing-collars may be easily fitted to the shaft and the sprockets and breakers secured upon the shaft without the use of set-screws.

In order to support the chains 63, I mount immediately beneath the upper portion of each chain and upon the upper edges of the cross-bars 61' a narrow platform 71. For the purpose of supporting the grain so that it may not be engaged by any portions of the chains except the drags carried thereby I mount upon the upper edges of the cross-bars 61' between each pair of chains and upon the outside of each of the outer chains a bar 72, upon the upper face of which is secured a strip 73, preferably of sheet metal. The strips 73 are brought as close together as possible, allowing only sufficient room between the adjacent edges thereof to permit the passage of the drags, the said drags being of sufficient length to project some distance above the grain-supporting platform thus formed. At the inner ends the distance between the adjacent edges of the strips 73 is widened, so as to permit the passage of the arms 68 of the breaker-wheels 67. At these ends the strips are thrown forward and down until they pass beyond the path of movement of the outer ends of the drags and breaker-arms as they pass around the shaft. The transverse table as a whole is pivotally supported upon the shaft 60 in the bearings 59 of the castings 29, and for the purpose of driving said shaft and the belts connected therewith I provide a shaft 74, which is supported in suitable bearings on the castings 29 and to the ends of which are secured the gears 75 75, which mesh with the gears 76, carried by one end of each of the shafts 60. Shaft 74 may be driven by any suitable means, such as a shaft 77, which shaft may also be connected so as to drive the shafts 56 and 17.

In order that the transverse tables may be adjusted about the shafts 60, I provide one or more braces 78, the outer end of each of which is pivoted to the table near its outer end and the other end of which may be placed in any one of a series of eyes 79, secured to a stationary portion of the framework.

The guard-plate 39, previously mentioned, is provided to prevent the grain from piling up back of the cutters, and also to prevent uncut bundles of grain from lodging end up above the cutters and gradually forced down into a position where successive portions will be cut from the butt-ends thereof, as is sometimes the case in machines of this general class. As previously stated, the lower edge of this guard-plate is hinged to the upper end of one of the flanges of the angle-iron 34, and in order that the upper edge thereof may be adjusted I provide for each guard-plate a pair of rods 80, one end of each of which is pivoted to the guard-plate near its free edge and the opposite end of which is passed through an eye 81, pivoted upon the uprights 40, and to which eye the said rod may be adjustably secured.

In feeding a separator by hand it is the custom for the operator to so hold the mass of grain that the top of the mass will be gradually stripped away by the action of the cylinder instead of throwing a mass of grain suddenly into the throat of the machine, and thus choking it. In such operation the fingers of the operator serve to retard the lower portions of the mass of grain until the upper portions have been stripped away. In the present machine I have accomplished the same result by placing along the front edge of the platform formed by the strips 13 a series of projecting fingers 82, which project out over the throat-piece and into the throat of the separator. These fingers 82 retard the mass of grain as it passes from the vibrating table to the cylinder, and thus prevents the throat from becoming choked.

The operation is as follows: The several parts are caused to rotate in the directions indicated by the arrows. Bundles of grain (or grain in bulk) are then thrown upon the platforms of the transverse tables, where the grain is caught by the drags 64 and moved toward the center of the machine. As the grain advances it is engaged by the cutters 35 36, and the mass of grain is severed, the said cutters thus positively determining the amount of grain which can pass at any given time from the transverse tables to the vibrating table. As that portion of the grain beneath the cutters is advanced one of the arms of the breaker-wheels rises between the strips 73 and lifts or strips the grain free from the drag, so that the drag may then pass down between the said strips without carrying the grain with it. A further advancement of the chains causes another arm of the breaker-wheels to rise between the strips 73 between the pair of drags nearest the inner end of the table, thus loosening the grain and crowding it forward beneath the knives. It will be noticed that the grain is crowded beneath the knives by the arms of the breaker-wheels rather than by the drags 64, so that the grain is fed more continuously to the vibrating table. The arms of the breaker-wheels also serve to loosen up the mass of grain before it passes to the vibrating table. The grain passes from the two transverse tables to the central vibrating table, where it is supported upon the feed-bars and by them forced toward the cylinder 11. It is to be noticed that here the feed-bars, at their rear ends, travel along the stationary portion of the table and therefore have no movement out of the plane thereof, while the forward lower ends of said feed-bars are given a slight upward movement at the same time that they are driven down toward the cylinder. On the return stroke the lower ends are thrown down as they recede, thus allowing the grain to slip freely down toward the cylinder. I have found in practice that this movement gives a much better feed to the grain than where the feed-bars are given at both ends a movement similar to that of the lower ends in the present device. The amount of agitation of the lower ends of the feed-bars may be increased or diminished by shifting the pivotal point of the links 20 upon the brackets 21'. As the grain passes down it passes over the fingers 82, and as it reaches the rapidly-revolving cylinder it is tipped up and drawn down into the throat of the machine between the cylinder and concave. If the throat were entirely unobstructed, large masses of the grain would thus be suddenly drawn down between the cylinder and concave and the machine stopped. The fingers 82, however, operate to retard the lower portions of the mass of grain until the upper portions have been stripped away by the cylinder, so that the grain is thus evenly fed to the cylinder. Where loose dry grain is being handled, the feed-table will be placed as far back as possible, (in the position shown in Fig. 2;) but in handling grain which is soggy and partially grown together the throat is narrowed by withdrawing bolts 28, shifting the table forward the desired amount, and placing the bolts 28 in one of the rear holes 27. In this movement of the table there is a slight pivotal movement about the lower edge of the throat-piece 23. There is a further object in hinging the throat-piece to the lower end of the vibrating table. It will be noticed that by slightly raising the forward end of the table, the lower end of the throat-piece may be swung back until its lower end clears the concave, when the table, as a whole, may be swung down around the bolts 28 as pivots, thus giving free and easy access to the cylinder and concave without removing any portion of the feeding mechanism.

In order to adjust the cutters toward or from the transverse tables, the operator turns the hand-wheels 49, which, through the cables 47 and drums 46, will cause the pinions 42 to move down or up the racks 41. By this means the amount of grain passing from either transverse table to the vibrating table may be accurately regulated, so that the separator may be worked to its full capacity without crowding.

That portion of the grain which does not pass under the cutters is forced upward by the oncoming grain and is then deflected downward by the guard-plate 39, so that it may be again advanced by the drags 64 and eventually forced beneath the cutters. The guard-plate is especially useful in preventing bundles from standing upright upon the table and being fed forward in such manner that successive layers would be cut from the butt-ends thereof.

I claim as my invention—

1. In a feeder, the combination with a stationary platform having a series of longitudinal slots formed therein, a series of feed-bars mounted in said slots, means for reciprocating said feed-bars, a pivotal support for the rear end of said platform, a throat-piece hinged to the forward end of said platform, and means for supporting the free end of the throat-piece.

2. In a feeder, the combination with a stationary platform, of feeding mechanism mounted thereon, means for operating said feeding mechanism, a pivotal support for the rear end of said platform, means for shifting said platform with relation to the support, and means for supporting the forward end of the table.

3. In a feeder, the combination with a stationary platform, of a series of feed-bars mounted on said platform, means for reciprocating said bars, a pivotal support for the rear end of said platform, means for shifting said support with relation to the platform, a throat-piece hinged to the forward end of the platform, and means for supporting the free end of said throat-piece.

4. In a feeder, the combination with a stationary platform, of a series of feeder-bars mounted thereon, means for reciprocating said bars, the said bars being slidably supported, at their rear ends, upon said platform, a series of links each of said links being pivoted at one end to one of the feed-bars near its forward end, and a series of brackets mounted one near each link and provided with an adjustable pivotal support for the lower end of the adjacent link.

5. In a feeder, the combination with a stationary platform having a series of longitudinal slots formed therethrough, of a series of feed-bars mounted in said slots, means for reciprocating said bars, the said bars being slidably supported, at their rear ends, upon said platform, and a series of links, each of said links being pivoted at one end to one of the feed-bars near its forward end, and pivoted at its other end to a suitable support.

6. In a feeder, the combination with a stationary platform having a series of longitudinal slots formed therethrough, of a series of feed-bars mounted in said slots, means for reciprocating said bars, the said bars being slidably supported, at their rear ends, upon said platform, a series of links each pivoted at one end to one of the feed-bars near its forward end, and a series of brackets mounted one near each link and provided with an adjustable pivotal support for the other end of the adjacent link, substantially as described.

7. In a feeder, the combination with a stationary platform having a series of slots formed therethrough, of a series of feed-bars mounted in said slots, means for reciprocating said bars, the said bars being supported, at their rear ends, directly upon said platform, a series of links each pivoted at one end to one of the feed-bars near its forward end, a series of brackets mounted one near each link and provided with an adjustable pivotal support for the other end of the adjacent link, and a series of retarding-fingers secured to the forward end of the platform and projecting therefrom, substantially as described.

8. In a feeder, the combination with an endless belt, of a series of drags carried by said belt, and a rotatable wheel having its axis inside the bight of the belt, provided with one or more arms adapted to strip material from said drags.

9. In a feeder, the combination with an endless belt, of a series of drags carried thereby, of a shaft carrying a pulley adapted to drive said belt, a rotatable wheel also mounted on said shaft adjacent the pulley and provided with one or more arms adapted to strip material from the drags as they pass around the shaft.

10. In a feeder, the combination with an endless belt, of a series of drags carried by said belt, and a rotatable wheel, provided with one or more arms, the relative arrangement of arms and drags being such that an arm will strip material from each drag at one point in its travel, and an arm will also rise between each pair of drags immediately following the stripping action of the first arm, substantially for the purpose set forth.

11. In a feeder, the combination with an endless belt, of a series of drags carried thereby, a shaft carrying a pulley adapted to drive said belt, a rotatable wheel also mounted on said shaft adjacent the pulley and provided with one or more arms, the relative arrangement of arms and drags being such that an arm will strip material from each drag as it passes around the pulley while the following arm will rise between the said drag and the succeeding drag, substantially as described.

12. A transverse feed-table for feeders, consisting of the main frame, a shaft mounted in said frame and carrying a series of pulleys, a series of feed-belts passing over said pulleys, a series of drags carried by each belt, a breaker-wheel mounted on said shaft adjacent each pulley and provided with one or more arms adapted to strip material from each drag as it passes around the shaft, a platform mounted beneath the upper side of each belt in position to support it, and a series of platforms mounted between each pair of chains above the upper sides thereof, with sufficient space between the adjacent edges thereof to allow the passage of the drags and breaker-arms, substantially as described.

13. A transverse feed-table for feeders, consisting of the main frame, a shaft mounted in said frame and carrying a series of pulleys, a series of feed-belts passing over said pulleys, a series of drags carried by each belt, a breaker-wheel mounted on said shaft adjacent each pulley and provided with one or more arms, the relative arrangement of arms and drags being such that an arm will strip material from each drag as it passes around the shaft while the following arm will rise between the said drag and the succeeding drag, a platform mounted beneath the upper side of each belt in position to support it, and a series of platforms mounted between each pair of chains, above the upper sides thereof, with sufficient distance between the adjacent edges thereof to allow the passage of the drags and breaker-arms, substantially as described.

14. In a feeder, the combination with a cutter-supporting arm, pivoted upon a suitable support at one end and carrying a cutter at the other end, of a stationary rack, a pinion mounted so as to move along said rack, intermediate connections between said pinion and the cutter-arm allowing a relative upward movement of the cutter-arm, and means for rotating the pinion, whereby a rotation of the pinion will cause the pinion to move along the rack and the cutter-arm to swing upon its pivot.

15. In a feeder, the combination with a pair of cutter-supporting arms, pivoted upon suitable supports at one end and supporting a cutter which connects the other ends, of a pair of stationary racks one mounted near each arm, a pair of pinions one mounted on each rack, a shaft carrying said pinions, intermediate sliding connections between said shaft and the cutter-arms allowing a relative upward movement of the cutter-arms, and means for rotating the pinions, whereby a rotation of the shaft will cause the pinions to move along the racks and the cutter-arm to swing about its pivot, substantially as described.

16. In a feeder, the combination with a pivoted cutter-supporting arm carrying a cutter at its free end, means for swinging said arm about its pivot, a shaft carried in suitable bearings on said arm, intermediate connections between said shaft and cutter, a universal joint mounted on said shaft substantially in line with the pivotal point of said arm, and a driving-shaft connected to said joint, substantially as described.

17. In a feeder, the combination with a cutter-supporting arm, pivoted upon a suitable support at one end and carrying a cutter at the other end, of a rack, a pinion mounted so as to move along said rack, intermediate connections between said pinion and the cutter-arm, means for rotating the pinion, a shaft carried in suitable bearings on the cutter-arm, intermediate connections between the shaft and the cutter, a universal joint mounted on said shaft substantially in line with the pivotal point of the cutter-arm, and a driving-shaft connected to said joint, substantially as described.

18. In a feeder, the combination with a pair of pivoted cutter-supporting arms, of an angle-iron mounted between and connecting the free ends of said arms, a reciprocating cutter mounted upon one flange of said angle-iron, a guard-plate hinged to the other flange of said angle-iron, means operating the cutter, and means for adjusting the guard-plate, substantially as described.

19. In a feeder, the combination with a pair of pivoted cutter-supporting arms, of an angle-iron mounted between and connecting the free ends of said arms, a reciprocating cutter mounted upon one flange of said angle-iron, a guard-plate hinged to the other flange of said angle-iron, means for adjusting said guard-plate, a shaft mounted in suitable bearings on one of the cutter-supporting arms, intermediate connections between said shaft and cutter, and a universal joint mounted on said shaft substantially in line with the pivotal line of the cutter-supporting arms, substantially as described.

20. In a feeder, the combination with a pair of pivoted cutter-supporting arms, of an angle-iron mounted between and connecting the free ends of said arms, a pair of reciprocating cutters mounted upon one flange of said angle-iron, the end of said flange extending the length of and forming an abutment for the rear edges of the cutters, substantially as described.

21. In a feeder, the combination with a pair of pivoted cutter-supporting arms, of an angle-iron mounted between and connecting the free ends of said arms, a pair of reciprocating cutters mounted upon one flange of said angle-iron, the end of said flange forming an abutment for the rear edges of the cutters, a guard-plate hinged to the end of the other flange of the angle-iron, and means for adjusting said guard-plate, substantially as described.

W WEBSTER COLLINS.

Witnesses:
 ARTHUR M. HOOD,
 FRANK A. FAHLE.